United States Patent [19]
Tarvin

[11] 3,716,254
[45] Feb. 13, 1973

[54] DETACHABLE FOLDING CAMPER STEPS

[76] Inventor: Edward M. Tarvin, Route No. 1 Box 74A, Terra Bella, Calif. 93270

[22] Filed: Jan. 29, 1971

[21] Appl. No.: 111,030

[52] U.S. Cl..................................280/166, 280/500
[51] Int. Cl................................................B60r 3/02
[58] Field of Search......280/163, 164, 166, 500, 505; 296/62; 105/443, 447, 448; 224/42.03, 42.07, 42.08; 182/91, 92, 95; 52/183

[56] References Cited

UNITED STATES PATENTS

| | | | |
|---|---|---|---|
| 3,507,515 | 4/1970 | Brammer | 280/166 |
| 839,238 | 12/1906 | Wade | 105/447 |
| 369,129 | 8/1887 | Sheldon | 105/447 |
| 560,752 | 5/1896 | Prator | 296/62 UN X |
| 63,458 | 4/1867 | Baker | 280/166 |
| 1,195,869 | 8/1916 | Taylor | 182/95 |
| 2,493,639 | 1/1950 | Pellegrini | 182/95 |
| 2,809,849 | 10/1957 | Benne | 182/91 X |
| 3,330,577 | 7/1967 | Mills | 280/166 |
| 3,394,947 | 7/1968 | Strube | 280/166 |
| 3,580,613 | 5/1971 | Northrop | 280/166 |

*Primary Examiner*—Leo Friaglia
*Assistant Examiner*—Robert R. Song
*Attorney*—John E. Becher

[57] ABSTRACT

A detachable pair of folding steps for use with a rear bumper of a camper vehicle and attachable thereto so that the top step is supported on and projects substantially coextensively beyond the bumper's upper horizontal surface by use of the conventional drop-in hitch pin as provided with many such bumpers, and which pin passes through an aperture customarily provided in alignment with the hitch pin. The lower step is foldable about pivot bolts in the upper portions of oppositely spaced brackets affixed thereto and is connected with complementally disposed side brackets affixed to and depending from the rearward underside of the top step. The top step plate is notched at its rearwardmost, laterally opposite sides to complementally receive, in a light friction fit manner, the side brackets of the lower step when folded up into overlying condition with the tread surface thereof laying face down on the face-up tread surface of the upper step. A riser plate is affixed to the rearward edge of the lower step and its side brackets, as viewed when facing said steps for use, and is of at least the same lateral extent as the outside span of the upper step's side brackets. The riser plate is notched out at its opposite outer and upper ends just sufficiently to complementally receive the upper brackets and to provide suitable support for holding the lower step in its unfolded horizontal use condition. The respective pairs of pivotally connected side brackets are of a height approximating slightly more than about one-half the overall riser height so that the lower step will fold over and rest upon the upper step when not in use.

17 Claims, 10 Drawing Figures

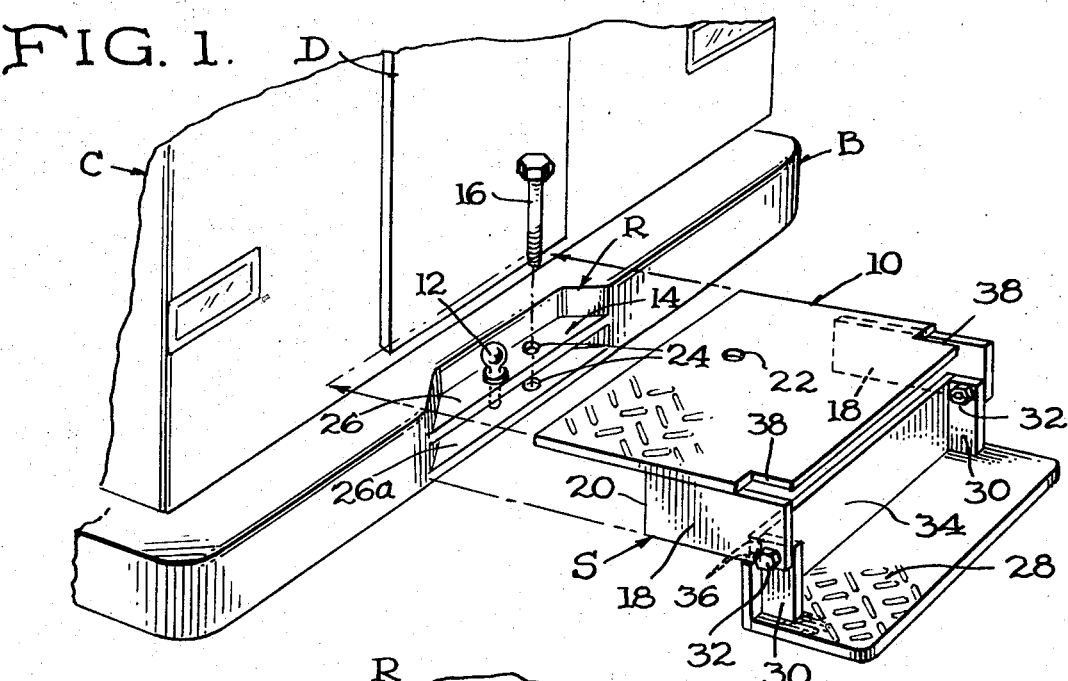
FIG. 1.
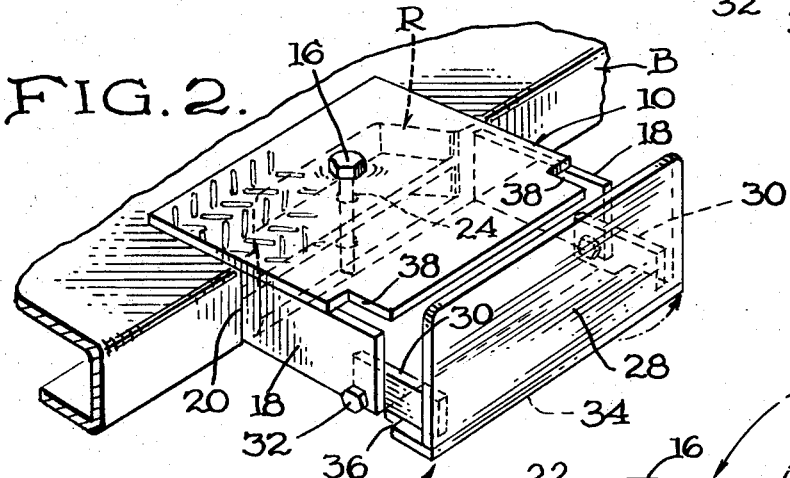
FIG. 2.
FIG. 4.
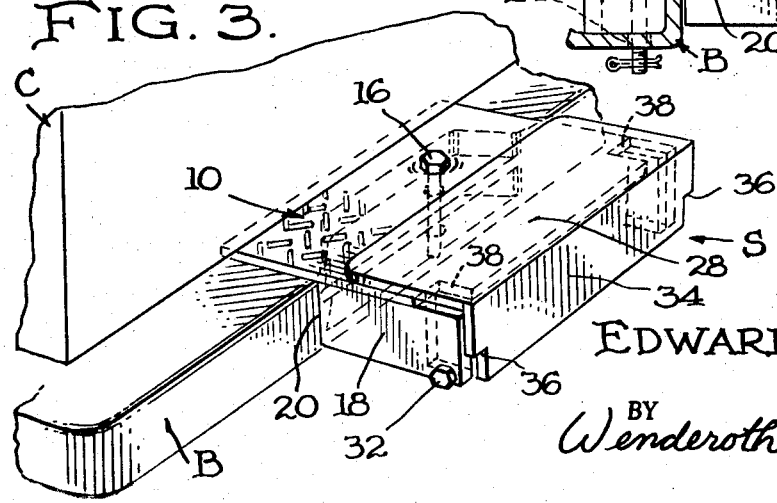
FIG. 3.
INVENTOR
EDWARD M. TARVIN
BY
Wenderoth, Lind & Ponack
ATTORNEYS

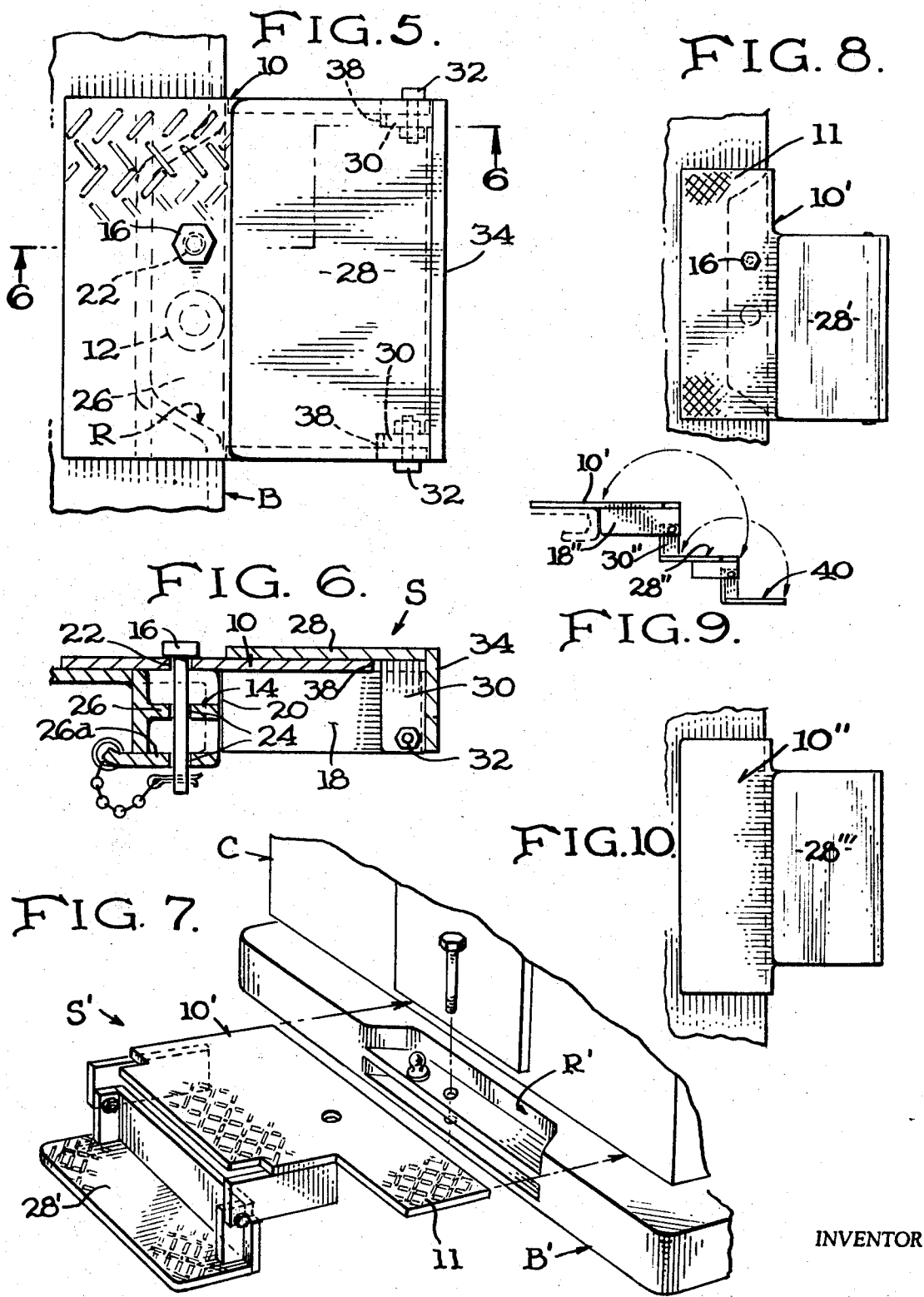

DETACHABLE FOLDING CAMPER STEPS

This invention relates to detachable and foldable bumper steps for use with campers and adapted to be detachably attached on the rear bumper of a pickup camper and the like.

Camper bodies customarily are placed upon motor trucks of the "pick-up" type. These trucks conventionally have rear bumpers which extend across the vehicle in the usual manner and are relatively wide and flat across the top, the flat top serving as a step to facilitate entry into the truck body when it is used without the camper body.

When a camper body is mounted on the truck, the wide flat bumper can still be used as a step, but it is of much greater height and usually lesser tread depth than a normal stairway step, and ingress to and egress from the camper body is inconvenient and difficult, particularly where the camper body overhangs the bumper.

In many cases, the bumper of such a vehicle is provided with a recess extending inwardly from the rear and downwardly from the flat upper surface at the rear central portion of the bumper to receive either a drop-in-type hitch plate and pin, or a trailer hitch ball element which is securely mounted in the well or recess. Sometimes these bumpers are provided with both types of hitching means side-by-side.

It is desirable to have steps on the back of the camper or pickup in which at least one step is lower than the bumper and which steps are foldable to a position above the bumper or readily removable therefrom when not in use. The steps desirably fit over the top of the trailer hitch. The steps therefore must be readily movable in such a way that access can be obtained to the trailer hitch when it is desirable to use the same.

By various aspects of this invention, one or more of the following, or other, objects can be obtained.

It is an object of the invention to provide a camper step construction which can be secured to the bumper easily and quickly without requiring the use of tools, by means of the standard trailer hitch pin or bolt, and in a manner which will facilitate entry into the camper body and which, when not in use, can be folded or collapsed on the top of the bumper, or completely and quickly removed therefrom so that the trailer hitch ball or drop-in hitch-pin-type hitch means are readily accessible when it is desired to pull a trailer.

It is a further object of this invention to provide a two-step bumper unit which is foldable to a position wherein one step overlies the other when not in use, and which when in use provides an upper step of greater fore-and-aft tread depth generally coextensive with and projecting a substantial distance beyond the bumper adjacent the camper door to provide a greater measure of safety in entering or leaving said trailer.

An additional object of the present invention is to provide a removable step for a truck camper which is economical of construction due to being relatively simple in design and rugged of construction, whereby it may afford a long and trouble-free service life.

These and other objects and advantages of the present invention will become apparent from the following detailed description, when taken in conjunction with the illustrative drawings wherein:

FIG. 1 is a perspective view showing a preferred form of removable step in exploded relation to the rear bumper of a truck camper and ready for mounting in accordance with the present invention;

FIG. 2 is a perspective view of said removable step showing such step attached to said bumper, with the lower step appearing in partially raised condition;

FIG. 3 is a perspective view of said removable step shown in completely folded condition.

FIG. 4 is a side elevational view of the steps of FIGS. 1-3, shown in the unfolded position and attached to a bumper shown in cross-section;

FIG. 5 is a top plan view of the steps as shown in the folded condition of FIG. 3;

FIG. 6 is a cross-sectional detail view of the folded steps as taken substantially on line 6—6 of FIG. 5;

FIG. 7 is a perspective view similar to FIG. 1 but showing a slightly modified embodiment;

FIG. 8 is a top plan view similar to FIG. 5 but of the embodiment shown in FIG. 7.

FIG. 9 is a semi-diagrammatic side elevational view on a reduced scale of still a further embodiment;

FIG. 10 is a top plan view on a reduced scale of a further embodiment.

According to the invention there is provided a foldable two-step unit S of the character described, for removable attachment to the rear bumper B of a truck camper unit C. The step unit has upper and lower step means each including a relatively flat tread surface, a back, a front and opposite sides from which respective pairs of brackets are disposed toward each other and pivotally interconnected to facilitate the lower step folding upon and overlying the top step. Means are provided to connect the steps together and frictionally retain them in folded condition with the lower step brackets recessing in friction-fit slots at the sides of the upper step. A riser plate on the lower step is notched at its upper, opposite ends to engage against the lower edge of the upper step's depending side brackets to hold the lower step in a horizontal unfolded condition.

Referring more specifically to the drawing FIGS. 1-6, the step unit S is fabricated of rigid material such as steel or other durable material and preferably having a non-slip surface. It includes an upper step plate 10 which comprises a generally rectangular plate of sufficient fore-and-aft depth to overlay a substantial part of the upper flat surface of the bumper B and to project a good distance rearwardly thereof to provide a substantial greater than normal tread surface for the step adjacent the entry door D of the camper unit C. This is particularly advantageous where larger size camper units overhang the rear bumper. Many standard bumpers B are provided with the usual medially located hitch recess R, which extends downwardly and inwardly respectively from the usually flat upper surface and the generally vertical rearward surface of bumper B, to receive the mounting therein of either the ball element 12 of a ball type hitch, or a drop-in-pin type hitch means including a plate 14 and a pin 16. Upper step plate 10 is preferably of a length to fully cover the lateral extent of said hitch recess R, even if the rest of the step unit S is of lesser width as shown in the embodiment of FIGS. 7 and 8, which will be discussed later herein.

Plate 10 is provided at its opposite lateral sides with a pair of brackets 18, 18 having substantially less fore-and-aft extent than plate 10, and having a height approximating one-half or slightly more of the overall riser height between the step treads. The brackets 18, 18 are rigidly attached, as by welding, in depending fashion preferably from underneath and outwardly flush with the opposite lateral sides of plate 10, to help support the step structure S by means of the aft portions 20, 20 of said brackets 18, 18 abutting against said rear vertical bumper surface.

Plate 10 affixes the completed step structure S to the bumper by means of the standard hitch pin 16 passing through an aperture 22 provided in alignment with the usual at least one hitch pin aperture 24 provided in the intermediate hitch plate 26. Preferably and usually a second apertured hitch plate 26a is provided or may comprise the lower return flange of the bumper B, to give added stability to mounting of the hitch pin. Because the various manufactures of these vehicle bumpers locate the hitch pins in varying places, the aperture 22 is made in plate 10 only after such a unit S is obtained for a camper vehicle and during its initial installation thereon to better assure alignment of hole 22 with the bolt holes 24 in the mounting plate 24.

The lower step 28 comprises a rigid rectangular tread plate of approximately the same lateral extent as upper step plate 10, but being of lesser tread depth in a fore-and-aft direction. Step plate 28 when disposed in the horizontal, non-folded condition, has a pair of rigidly affixed upstanding hinge brackets 30, 30 projecting upwardly from the rearward opposite portions of step 28, a distance approximating the other half or slightly more of the overall riser height. These brackets 30, 30 are pivotally connected at their respective upper portions, as by nut-and-bolt assemblies at 32, 32, to and inwardly of the lower portions of said brackets 18, 18 depending from said upper step plate 10. A partial riser plate 34 is rigidly connected to the rear portions of said lower step plate 28 (when facing same) and to its upstanding brackets 30, 30, and is of at least the same lateral extent as the outside dimension of the laterally spacing of the upper step's side brackets 18. The riser plate 34 is notched out at 36 just sufficiently to complementally receive the upper brackets 18 and to provide suitable support for holding the lower step 28 in its unfolded horizontal condition. The upper step plate 10 is notched at the opposite rearward sides 38, 38 just sufficiently to complementally accommodate a slight friction fit of the lower step's side brackets 30 when the lower step 28 is folded up into its non-use condition.

It is apparent that a novelly improved simple step unit has been evolved which comprises basically only two parts or subassemblies pivotally connected by two bolts. An exemplary size unit S which has been found to work well is one made of ⅛ inch thick steel plate which measures approximately only 18 inches (wide) × 16 inches (fore-and-aft) × 4 inches high when in the folded-up condition. Because of the overlap needed for the hinge or pivot brackets, the riser height between the steps is preferably a comfortable 7 inches. The tread depth on the lower step as illustrated in FIG. 4 may be approximately 8 inches, although it may be varied to a greater depth as long as it doesn't interfere with the hitch bolt 16 when in the folded-up condition. Such corresponding dimension would preferably be greater than 8 inches for the embodiment shown in FIG. 9 to be described hereinafter. The hinge bolts may be of 5/16 inch diameter × 1 inch in length.

Referring next to the embodiment shown in FIGS. 7 and 8, the basic unit S' is substantially identical to that of unit S, except for the relative length of the upper step plate 10' compared to the rest of the step unit. In some instances, the recess R' provided in a bumper B' may be of an exceptional length or for which it may not be necessary or desirable to have the step made of a corresponding length, since obviously it would require more material and would become a heavier or larger unit to handle and store when not needed. Therefore, preferably the two basic step parts of the unit may be made of one lateral width or extent and the top step plate may have an extended flange portion 11 to fully cover the recess R'. Such a flange portion may extend in either one or the other direction, or it is within the contemplation to extend it in opposite directions beyond the width of the steps per se, as shown in FIG. 10. In this instance it may be desirable to fabricate the top step plate 10" of a slightly heavier gauge material.

The operation of the foldable and detachable step unit is deemed to be fully apparent from the foregoing detailed description, and need not be repeated. It is to be noted, however, that the slots 38 at the opposite sides of the top plate 10 enable the bottom step to fold up thereinto, with the relative dimensions of the slots, and hinge brackets 30 of the lower step, being such as to insure a snug or press fit of said brackets within said slots. This snugness, plus the weight of the bottom step when overlaying the top step, together with the off-center disposition of the pivot bolts 32, all contribute to prevent the folded-up step from coming down when the camper is in transit.

Also, while many pickup truck bumpers come premade with both a ball-type or bolt-type hitch, the step unit of this invention can be used with a conventional ball-type trailer hitch in place as long as the top of the ball does not project higher than the top generally flat surface of the bumper.

While the successfully tested steel plate models are relatively light weight, weighing on the order of approximately 24 lbs., it is also within the contemplation of this invention to have the two basic step parts fabricated of a high strength plastic material to enable them to be even much lighter weight while still providing a most durable unit, and making the drilling of the hitch pin hole in the field even easier.

Referring further to the embodiment of FIG. 9, it is understood that for larger trucks which may have a bumper height requiring a further 3rd step, such a third step designated 40, can be hingedly attached and folded upon step 28" which would become the intermediate step, and would also be fabricated with notches and more on the order of top step plate 10' in order to receive step 40 in its folded condition therein. Then, because of there being two superposed tread thicknesses to be subsequently overlaid upon the top step 10' the relative height of hinge brackets 18" and 30" and the pivot bolt therefore would have to be adjusted to accommodate the added thickness of the third tread plate when they are in the folded condition. In this embodiment, adjustments to the depth of tread 28" could be made also to assure adequate tread depth of all of the steps.

From the foregoing, it is apparent that an improved camper step unit has been evolved which achieves all of the objects and advantages set forth in the preamble and elsewhere in this specification.

Reasonable variations and modifications are possible to ones skilled in the art within the scope of the foregoing disclosure and drawings without departing from the spirit of the invention. For example, it is understood that where heavier gauge metal or reenforced plastic or like materials may be used in the fabrication, particularly for the tread plates, then the riser plate 34 need not extend completely across the full lateral width of the steps as long as end portions thereof are provided adjacent the opposite side edges, or suitable lugs are provided on said lower step brackets to project laterally therefrom so as to provide support abutments of a generally equivalent structure or function. Also, the depending hinge brackets and adjacently disposed slots in the upper tread plate need not be disposed at extreme opposite sides thereof, and may under some circumstances or forms hereof comprise either more or less (if centrally disposed) than the disclosed two pairs of brackets with corresponding slots.

Accordingly, reference should be made to the appended claims to determine the scope of the exclusive property being claimed.

I claim:

1. A readily and selectively attachable and detachable folding step unit for use with the rear of a pickup type truck, or truck-mounted camper vehicle and the like, having a back bumper type support with a generally flat horizontal upper surface and generally vertical rearward surface, and further embodying a generally medially recessed trailer hitch means of the conventional drop-in bolt type within said bumper, said step unit comprising in combination:

a. First upper and second lower pivotally connected step means separated by a riser distance of normal step height, each step means comprising a basic generally flat tread plate with upper and lower surfaces, and rearward, forward and opposite sides.

b. said first upper step tread plate being of a size and including a substantially flat portion for engagement upon said upper surface of said bumper-type support overlying at least part of said recessed trailer hitch means and also projecting substantially co-planar therewith a sufficient distance behind said bumper type support to constitute a complete and safe step tread; said upper tread plate being apertured to correspond with and closely receive therethrough said drop-in bolt of the hitch means so as to detachably secure said step unit onto said bumper-type support;

c. cooperable pivot-enabling bracket and hinge means on said first and second step means pivotally connecting said steps together so that in the unfolded condition the steps are disposed in normal step fashion, and when in the folded-up condition the second step tread plate overlays that of the first step means in tread-to-tread relation;

d. said bracket and hinge means including at least one hinge bracket rigidly attached to and extending a free portion thereof a distance approximating half the riser height at substantially right angles from each of said upper and lower step tread plates toward each other in a non-coplanar but closely adjacent relationship, and having hinge pin means interconnecting said brackets through alignable apertures formed in said adjacent free portions with said hinge pin disposed approximately midway of the riser height to facilitate the said folded-up condition; said at least one hinge bracket which depends from said upper tread plate having a terminal edge for abutting said vertical rearward surface of said bumper to supplementally support said step unit therewith and e. said upper tread plate having at least one notch recessed in the rearward edge thereof in corresponding coplanar relation with said bracket projecting from said lower step tread plate and being of a size corresponding essentially to the cross-sectional dimension of said latter bracket so as to receive said bracket therein when said second step is in said folded-up condition.

2. A step unit as defined in claim 1, wherein said second step means includes abutment means disposed thereon to engage a lower portion of said hinge bracket extending from said upper tread plate, to support said second step tread plate in a generally horizontal offset parallel position relative to the upper tread plate when in an unfolded in-use condition.

3. A step unit as defined in claim 2 wherein said abutment means comprises part of riser plate means attached at a generally right angle to and adjacent the back side of said second step tread plate.

4. A step unit as defined in claim 1, wherein said notch of para. (e) is of a size to effect a friction fit of said bracket projecting from said lower step tread plate when said latter step is in the folded-up condition.

5. A step unit as defined in claim 1, wherein said bracket and hinge means include at least one pair of hinge brackets disposed in a laterally spaced-apart manner on each of said upper and lower step tread plates in the manner defined, and a corresponding pair of notches is provided in said upper tread plate as per para. (e) of claim 1.

6. A step unit as defined in claim 5 wherein said pair of hinge brackets on said upper step tread plate extend therefrom in depending relation from opposite extreme side edges thereof, and said pair of hinge brackets extending from said second step tread plate are disposed in corresponding near opposite extreme edges thereof, but laterally inwardly of said depending brackets.

7. A step unit as defined in claim 6, wherein said upper tread plate notches, for receiving said lower tread plate attached hinge brackets, when in the folded-up condition, are of a size to provide a light friction fit with said brackets to help retain said second step means in the folded-up condition when not in use during transit of said camper or truck vehicle.

8. A step unit as defined in claim 7 further comprising a third step means of the same general character as the first and second step means and pivotally connected to said second step means by hinge bracket means constructed and operable like those defined for said first and second step means respectively, and said third step means being foldable upon said second step means, and said third and second step means together then being foldable upon said first step means.

9. A step unit as defined in claim 8, wherein said second step means tread plate is provided with a pair of slotted apertures near its opposite lateral sides, like those of said first upper tread plate, to accommodate said hinge brackets of said third step tread plate when the latter is folded upon said second step tread plate.

10. A step unit as defined in claim 1 wherein said upper step tread plate includes at least one lateral extension portion of sufficient elongated length projecting beyond the lateral width of said basic step tread plates to assure complete overlying coverage of the hitch recess in said bumper.

11. A step unit as defined in claim 1, further comprising a third step means of the same general character as the first and second step means and being pivotally connected to said second step means by pivot-effecting hinge bracket means constructed and operable like those defined for said first and second step means respectively, and said third and second step means being respectively sequentially foldable to overlay the first step means when in a completely folded-up condition.

12. For use with a pickup type truck, or camper vehicle and the like, having a back bumper with a generally flat horizontal upper surface and generally vertical rearward surface, and further embodying a generally medially recessed trailer hitch means of the conventional drop-in bolt type within said bumper, a readily attachable and detachable foldable step unit for mounting on said bumper in at least partial overlying relation to said hitch by use of said hitch pin, said step unit comprising:
  a. first upper and second lower pivotally connected step means separated by a riser distance of normal step height, each step means comprising a basic generally flat tread plate with upper and lower surfaces, and rearward, forward and opposite sides;
  b. each step means having pivot-enabling bracket means including a pair of hinge brackets disposed at opposite sides of and complementally rigidly affixed respectively so as to have free end portions depend both from the lower surface, and to also project upwardly from the upper surface of said respective first and second step tread plate in an adjacent manner; and pivot pin means interconnecting the hinge brackets near their respective adjacent free ends at a point approximately midway of the riser distance between said steps to facilitate the said folded-up condition;
  c. said step and bracket means being of a relative size and disposition to enable said steps to be foldable between a first folded-up condition and a second unfolded condition, that when in said folded-up condition said second step overlays in face down condition a corresponding part of the face-up tread surface of the first step means, with said second step hinge brackets complementally recessed with a friction fit within slot-like apertures formed at opposite rearward sides of said upper step tread plate and in conjunction with said depending brackets thereof; and when in said unfolded condition said lower step tread plate is held in a generally horizontal, parallel offset condition relative to said upper step tread plate by rigid abutment means on said lower step means which abutment means engagingly abut lower portions of said upper tread plate's depending hinge brackets;
  d. said upper step tread plate being of a size and including a substantially flat portion for engagement upon said upper surface of said bumper in overlying relation to at least part of said recessed trailer hitch means and being apertured in alignment with and adapted to receive therethrough said drop-in hitch bolt for attaching said step unit to said bumper;
  e. said upper tread plate projecting generally coplanarly from the top of said bumper a sufficient distance to constitute a complete safe step tread independent of said bumper upper surface and beyond said camper vehicle to accommodate camper units of a length whose rearward most end overhangs most of said bumper; and
  f. said hinge brackets depending from said upper step tread plate having generally vertical, forwardly directed terminal edges disposed to engage with the generally vertical rearward surface of said bumper to supplementally support said step unit therewith.

13. A step unit as defined in claim 12, wherein said abutment means on second step means comprises at least a partial riser plate attached at a generally right angle to and adjacent to the back side of said second step means tread plate, and said riser plate having portions extending in laterally opposite directions beyond said hinge brackets of the lower step means to engagingly abut a lowermost portion of the free ends of said depending hinge brackets of the upper tread plate.

14. A step unit as defined in claim 12, wherein said upper step tread plate includes at least one lateral extension portion of sufficient elongated length projecting beyond the lateral width of said basic step tread plates to assure complete overlying coverage of the hitch recess in said bumper.

15. A readily attachable and detachable folding step unit for use with the rearward part of a pickup type truck or truck-mounted camper unit and vehicle, having a back bumper type support with a generally flat horizontal upper surface, generally vertical rearward surface, and embodying a generally medially recessed trailer hitch means of the aperture and drop-in bolt type formed within said bumper support, said step unit comprising in combination:
  a. first upper and second lower pivotally connected step means separated by a riser distance of normal step height, each step means comprising a basic generally flat tread plate with upper and lower surfaces;
  b. said step means being constructed to enable unfolding from a first folded up closed condition to an extended unfolded more useable condition;
  c. said upper step tread plate being of a size and including a substantially flat portion for complemental engagement upon said upper surface of said bumper in overlying relation to at least part of said recessed trailer hitch means and having stabilizing bracket means depending therefrom to bear against said rearward vertical surface of said bumper, and said upper step tread plate being apertured in alignment with and adapted to receive therethrough said drop-in hitch bolt for attaching said step unit to said bumper; and
  d. said upper step tread plate projecting rearwardly beyond said bumper a sufficient distance to constitute a safe step tread independent of said bumper upper surface and beyond said camper vehicle to accommodate camper units of a length whose rearwardmost end overhangs most of said bumper support.

16. A folding step unit as defined in claim 15, of which the structural components are so related as to provide at least a single step utility of the unit in its folded up condition, and to provide at least a double step unit in its unfolded condition.

17. A folding step unit as defined in claim 15, wherein said first step means includes dual purpose rectangular brackets at opposite lateral sides of said tread plate, said brackets depending from said tread plate a distance of approximately one half the overall riser height between said steps, and extending the full projection length of said tread plate; said brackets each having forward portions constituting said bracket means of para (c) for said abutment with the adjacent vertical rearward surface of said bumper to help support said step unit, and further including rearward portions having apertures and hinge pin means for connection with said second step means; said second step means having apertured brackets of approximately one half the riser height disposed near laterally opposite sides of said second step tread plate and pivotally connected with said depending brackets of said first step means; said second step means further including a riser plate corresponding generally to said one half distance of said overall riser height, and having abutment means at opposite ends for abutment with the underside of said dual purpose brackets of said first step means for thereby supporting said second step in the unfolded condition; and said first and second step brackets, tread plates, and second step riser plate being relatively proportioned and disposed so that when in the folded-up condition they provide a completely self-enclosed boxed unit.

* * * * *